(12) United States Patent
Fujita et al.

(10) Patent No.: US 10,737,213 B2
(45) Date of Patent: Aug. 11, 2020

(54) CARBON DIOXIDE CAPTURING SYSTEM AND EXHAUST GAS PROCESSING METHOD

(71) Applicant: KABUSHIKI KAISHA TOSHIBA, Minato-ku (JP)

(72) Inventors: Koshito Fujita, Yokohama (JP); Tetsuya Kaseda, Kawasaki (JP); Mitsuru Udatsu, Kawasaki (JP); Hideo Kitamura, Katsushika (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 87 days.

(21) Appl. No.: 15/613,488

(22) Filed: Jun. 5, 2017

(65) Prior Publication Data

US 2018/0001254 A1 Jan. 4, 2018

(30) Foreign Application Priority Data

Jun. 30, 2016 (JP) .................. 2016-130780

(51) Int. Cl.
*B01D 53/74* (2006.01)
*B01D 53/18* (2006.01)
(Continued)

(52) U.S. Cl.
CPC ....... *B01D 53/1475* (2013.01); *B01D 47/027* (2013.01); *B01D 47/028* (2013.01); *B01D 53/1406* (2013.01); *B01D 53/1412* (2013.01); *B01D 53/18* (2013.01); *B01D 53/62* (2013.01); *B01D 53/78* (2013.01); *F01N 3/04* (2013.01);
(Continued)

(58) Field of Classification Search
None
See application file for complete search history.

(56) References Cited

U.S. PATENT DOCUMENTS 4,431,617 A * 2/1984 Farin ............... B01D 53/48
162/30.1
5,582,807 A * 12/1996 Liao ............... B01D 47/06
423/210

(Continued)

FOREIGN PATENT DOCUMENTS

CN 101678271 A 3/2010
CN 103446848 A 12/2013
(Continued)

*Primary Examiner* — Philip Y Louie
(74) *Attorney, Agent, or Firm* — Oblon, McClelland, Maier & Neustadt, L.L.P.

(57) ABSTRACT

In one embodiment, a carbon dioxide capturing system includes an absorber configured to include a first contact portion that brings a combustion exhaust gas containing carbon dioxide into contact with an absorbing liquid containing an amine compound, cause the absorbing liquid to absorb at least a portion of the carbon dioxide in the combustion exhaust gas at the first contact portion, and release the combustion exhaust gas. The system further includes a washing apparatus configured to include a second contact portion that brings the combustion exhaust gas released from the first contact portion of the absorber into contact with a washing liquid, and configured such that the combustion exhaust gas and the washing liquid are individually fed to an upstream side of the second contact portion.

6 Claims, 9 Drawing Sheets

(51) Int. Cl.
   *B01D 53/14* (2006.01)
   *F01N 3/04* (2006.01)
   *F01N 13/00* (2010.01)
   *B01D 47/02* (2006.01)
   *B01D 53/62* (2006.01)
   *B01D 53/78* (2006.01)
   *F01N 3/08* (2006.01)

(52) U.S. Cl.
   CPC ....... *F01N 3/0857* (2013.01); *F01N 13/0093* (2014.06); *B01D 2252/204* (2013.01); *B01D 2258/0283* (2013.01); *B01D 2259/40001* (2013.01); *F01N 2570/10* (2013.01); *F01N 2590/10* (2013.01); *Y02A 50/2342* (2018.01); *Y02C 10/04* (2013.01); *Y02C 10/06* (2013.01); *Y02T 10/20* (2013.01)

(56) References Cited

U.S. PATENT DOCUMENTS

| | | | |
|---|---|---|---|
| 6,883,327 B2 | 4/2005 | Iijima et al. | |
| 7,866,638 B2 | 1/2011 | Neumann et al. | |
| 9,157,353 B2 | 10/2015 | Hodotsuka et al. | |
| 9,174,161 B2 | 11/2015 | Thomassen | |
| 2010/0254869 A1* | 10/2010 | Thomassen | B01D 47/08 423/232 |
| 2011/0135550 A1* | 6/2011 | Nagayasu | B01D 53/1418 423/230 |
| 2013/0284021 A1* | 10/2013 | Miyamoto | B01D 53/1418 95/183 |
| 2014/0241967 A1 | 8/2014 | Fujita et al. | |

FOREIGN PATENT DOCUMENTS

| | | |
|---|---|---|
| EP | 2 338 583 A2 | 6/2011 |
| GB | 2541339 A | 2/2017 |
| JP | 2004-323339 A | 11/2004 |
| JP | 2010-527767 | 8/2010 |
| JP | 2011-115724 | 6/2011 |
| JP | 2012-503541 A | 2/2012 |
| JP | 2013-107069 A | 6/2013 |
| JP | 2014-004578 | 1/2014 |
| JP | 5701998 B2 | 4/2015 |
| JP | 2016-381 A | 1/2016 |
| WO | WO 2004/039492 A2 | 5/2004 |
| WO | WO 2004/039492 A3 | 5/2004 |
| WO | WO 2012/070523 | 5/2012 |

* cited by examiner

CARBON DIOXIDE CAPTURING SYSTEM AND EXHAUST GAS PROCESSING METHOD

CROSS REFERENCE TO RELATED APPLICATION

This application is based upon and claims the benefit of priority from the prior Japanese Patent Applications No. 2016-130780, filed on Jun. 30, 2016, the entire contents of which are incorporated herein by reference.

FIELD

Embodiments described herein relate to a carbon dioxide capturing system and an exhaust gas processing method.

BACKGROUND

Regarding a thermal power plant and the like, methods have been studied to separate and capture carbon dioxide from a combustion exhaust gas by bringing the combustion exhaust gas into contact with an amine-based absorbing liquid to store the captured carbon dioxide without being released to the air.

Specifically, a carbon dioxide capturing system is known which includes an absorber that causes an absorbing liquid to absorb carbon dioxide contained in a combustion exhaust gas and discharges the absorbing liquid having absorbed the carbon dioxide (rich liquid), and a regenerator that heats the rich liquid discharged from the absorber and causes the rich liquid to release a carbon dioxide gas to regenerate the absorbing liquid. The regenerator is connected to a reboiler to supply a heat source to the regenerator. The absorbing liquid regenerated in the regenerator (lean liquid) is fed to the absorber, so that the absorbing liquid is circulated in the system.

DETAILED DESCRIPTION

Embodiments will now be explained with reference to the accompanying drawings. In FIGS. 1 to 9, the same or similar configurations are given the same signs and their duplicated description is omitted.

The conventional carbon dioxide capturing system, however, poses a problem that it causes dispersion of an amine compound (amino group containing compound) in the absorbing liquid to the air with the combustion exhaust gas, when the combustion exhaust gas is released from the absorber. In general, since a large amount of the combustion exhaust gas is released from the thermal power plant or the like, the carbon dioxide capturing system has to handle a large amount of the combustion exhaust gas and a large amount of the amine compound released with the combustion exhaust gas, which causes a high concentration of the amine compound in the combustion exhaust gas released from the absorber.

In one embodiment, a carbon dioxide capturing system includes an absorber configured to include a first contact portion that brings a combustion exhaust gas containing carbon dioxide into contact with an absorbing liquid containing an amine compound, cause the absorbing liquid to absorb at least a portion of the carbon dioxide in the combustion exhaust gas at the first contact portion, and release the combustion exhaust gas. The system further includes a washing apparatus configured to include a second contact portion that brings the combustion exhaust gas released from the first contact portion of the absorber into contact with a washing liquid, and configured such that the combustion exhaust gas and the washing liquid are individually fed to an upstream side of the second contact portion.

In another embodiment, an exhaust gas processing method includes bringing a combustion exhaust gas containing carbon dioxide into contact with an absorbing liquid containing an amine compound, causing the absorbing liquid to absorb at least a portion of the carbon dioxide in the combustion exhaust gas, and releasing the combustion exhaust gas. The method further includes bringing the released combustion exhaust gas and a washing liquid into a parallel flow to substantially flow in a same direction and into contact with each other to wash the combustion exhaust gas.

First Embodiment

Figure 1:
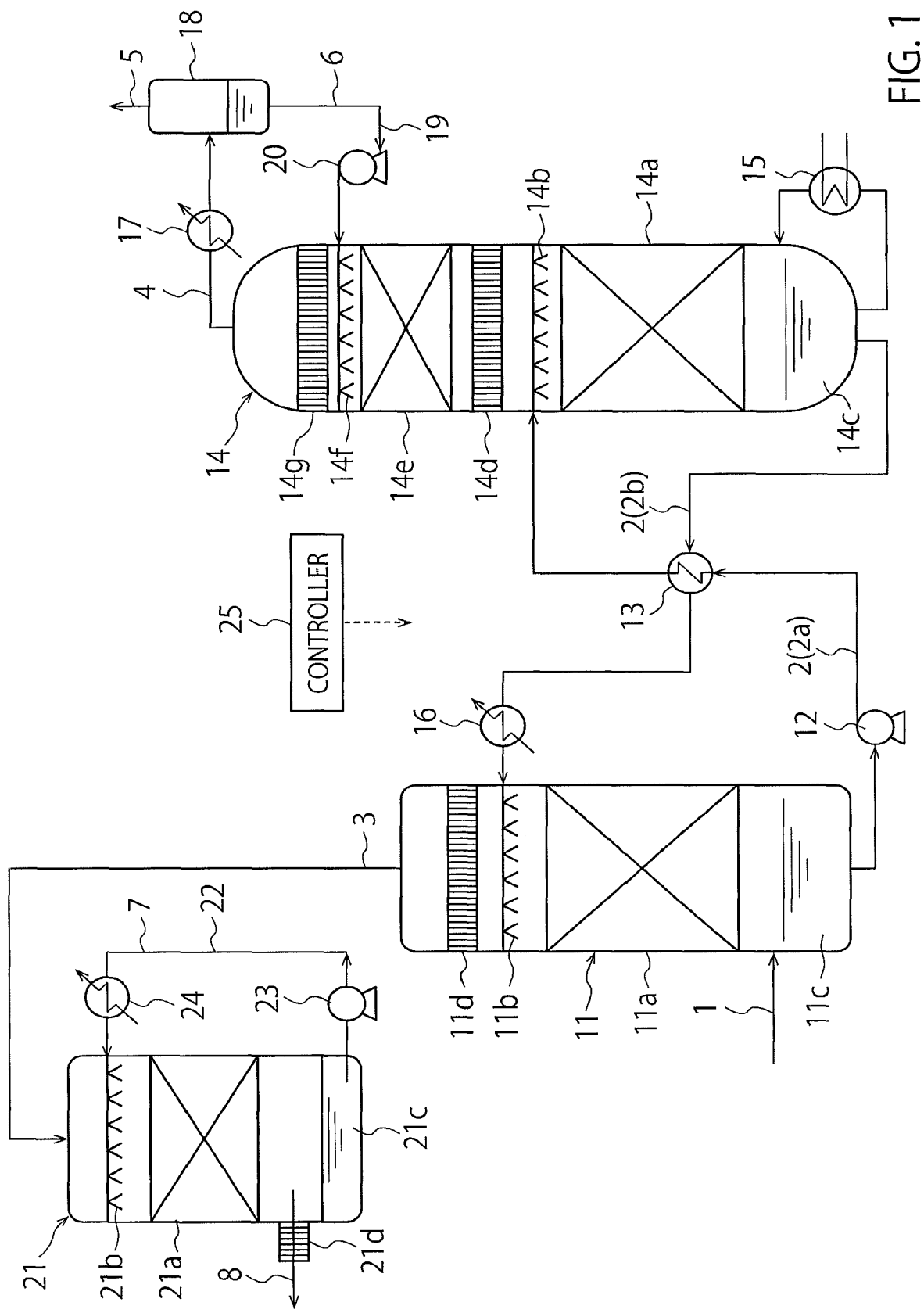
FIG. 1 is a schematic diagram showing a configuration of a carbon dioxide capturing system of a first embodiment.

FIG. 1 is a schematic diagram showing a configuration of a carbon dioxide capturing system of a first embodiment.

The carbon dioxide capturing system in FIG. 1 includes an absorber 11, an absorbing liquid pump 12, a heat exchanger 13, a regenerator 14, a reboiler 15, an absorbing liquid cooler 16, a mixture gas cooler 17, a gas-liquid separator 18, a condensed water channel 19, a condensed water pump 20, a washing apparatus 21, a washing liquid channel 22, a washing liquid pump 23, a washing liquid cooler 24 and a controller 25.

The absorber 11 includes a gas-liquid contact portion 11a, a distributor 11b, a liquid reservoir 11c and a demister 11d. The gas-liquid contact portion 11a is an example of a first contact portion.

The regenerator 14 includes a lower gas-liquid contact portion 14a, a lower distributor 14b, a liquid reservoir 14c, a lower demister 14d, an upper gas-liquid contact portion 14e, an upper distributor 14f and an upper demister 14g.

The washing apparatus 21 includes a gas-liquid contact portion 21a, a distributor 21b, a liquid reservoir 21c and a demister 21d. The gas-liquid contact portion 21a is an example of a second contact portion.

The absorber 11 has an inlet of a combustion exhaust gas 1 containing carbon dioxide below the gas-liquid contact portion 11a, and an inlet of an absorbing liquid 2 containing an amine compound above the gas-liquid contact portion 11*a*. The absorber 11 causes the absorbing liquid 2 to absorb carbon dioxide in the combustion exhaust gas 1 through contact of the combustion exhaust gas 1 and the absorbing liquid 2 with each other in the gas-liquid contact portion 11*a*. Specifically, the carbon dioxide is absorbed in the absorbing liquid 2 through contact of the absorbing liquid 2 which is distributed and caused to fall from the distributor 11*b* with the combustion exhaust gas 1 which rises in the gas-liquid contact portion 11*a*.

The absorbing liquid 2 having absorbed carbon dioxide is collected in the liquid reservoir 11*c* and discharged from a bottom portion of the absorber 11 as a rich liquid 2*a*. Meanwhile, the combustion exhaust gas 1 from which carbon dioxide is removed flows in the demister 11*d*. The demister 11*d* is provided for trapping mist of the amine compound along with the combustion exhaust gas 1. The combustion exhaust gas 1 having passed through the demister 11*d* is released from a top portion of the absorber 11 as a $CO_2$-removed exhaust gas 3.

The absorbing liquid 2 (rich liquid 2*a*) discharged from the absorber 11 is transferred via the heat exchanger 13 by the absorbing liquid pump 12, and introduced into the regenerator 14.

The regenerator 14 has an inlet of the absorbing liquid 2 above the lower gas-liquid contact portion 14*a*. The absorbing liquid 2 introduced into the regenerator 14 is distributed and caused to fall from the lower distributor 14*b* to the lower gas-liquid contact portion 14*a*, and releases carbon dioxide in the lower gas-liquid contact portion 14*a*. The absorbing liquid 14 having passed through the lower gas-liquid contact portion 14*a* is collected in the liquid reservoir 14*c*, and discharged from a bottom portion of the regenerator 14 as a lean liquid 2*b*.

A portion of the absorbing liquid 2 discharged from the regenerator 14 is fed to the reboiler 15. The reboiler 15 heats the absorbing liquid 2, and thereby, causes the absorbing liquid 2 to release carbon dioxide and steam. These gases are fed again to the regenerator 14. Then, the absorbing liquid 2 distributed and cause to fall from the lower distributor 14*b* is heated with heat of these gases in the lower gas-liquid contact portion 14*a*, so that carbon dioxide is released from the absorbing liquid 2 as mentioned above.

The carbon dioxide and the steam released from the absorbing liquid 2 flow in the lower demister 14*d*. The lower demister 14*d* is provided for trapping mist of the amine compound along with these gases. These gases having passed through the lower demister 14*d* pass through the upper gas-liquid contact portion 14*e*, the upper distributor 14*f* and the upper demister 14*g*, and after that, are released from a top portion of the regenerator 14 as a mixture gas 4. The role of the upper demister 14*g* is the same as that of the lower demister 14*d*.

The absorbing liquid 2 (lean liquid 2*b*) discharged from the regenerator 14 is transferred via the heat exchanger 13 and the absorbing liquid cooler 16, and introduced into the absorber 11. In this stage, the heat exchanger 13 heats the rich liquid 2*a* and cools the lean liquid 2*b* through heat exchange between the rich liquid 2*a* and the lean liquid 2*b*. The lean liquid 2*b* is further cooled by the absorbing liquid cooler 16.

Meanwhile, the mixture gas 4 released from the regenerator 14 flows in the mixture gas cooler 17. The mixture gas cooler 17 cools the mixture gas 4 to return the steam in the mixture gas 4 into water. Then, the gas-liquid separator 18 separates a carbon dioxide gas from the water. The separated carbon dioxide gas (captured $CO_2$ gas 5) could be stored in the ground (not shown), or used at other intended use. On the other hand, the separated water (condensed water 6) is returned to the regenerator 14 via the condensed water channel 20 by the condensed water pump 19. The condensed water 6 is distributed and caused to fall from the upper distributor 14*f* to the upper gas-liquid contact portion 14*e*, and used for washing the gas from the lower gas-liquid contact portion 14*a* in the upper gas-liquid contact portion 14*e*.

Moreover, the $CO_2$-removed exhaust gas 3 (hereinafter, also simply referred to as "exhaust gas 3") released from the absorber 11 flows in the washing apparatus 21. The washing apparatus 21 has an inlet of the exhaust gas 3 and an inlet of a washing liquid 7 on the upstream side of (above) the gas-liquid contact portion 21*a*. An example of the washing liquid 7 is water (for example, pure water).

The washing apparatus 21 brings the exhaust gas 3 into contact with the washing liquid 7 in the gas-liquid contact portion 21*a*, and thereby, washes the exhaust gas 3 with the washing liquid 7. Specifically, the washing liquid 7 distributed and caused to fall from the distributor 21*b* comes into contact with the exhaust gas 3 descending in the gas-liquid contact portion 21*a*, so that the exhaust gas 3 is washed with the washing liquid 7. As above, the washing apparatus 21 brings the exhaust gas 3 and the washing liquid 7 into contact with each other through a parallel flow of these from the upper portion to the lower portion of the gas-liquid contact portion 21*a*. Namely, in the washing apparatus 21, particularly in the gas-liquid contact portion 21*a*, the exhaust gas 3 and the washing liquid 7 flow so as to totally have substantially the same moving directions, and accordingly, the exhaust gas 3 and the washing liquid 7 come into contact with each other through the parallel flow.

The washing liquid 7 having passed through the gas-liquid contact portion 21*a* is collected in the liquid reservoir 21*c*, and discharged from a bottom portion of the washing apparatus 21 to the washing liquid channel 22. This washing liquid 7 is transferred by the washing liquid pump 23, cooled by the washing liquid cooler 24, and introduced again into the washing apparatus 21 from the inlet of the washing liquid 7.

Meanwhile, the exhaust gas 3 having passed through the gas-liquid contact portion 21*a* flows in the demister 21*d* provided near the bottom portion of the washing apparatus 21. The demister 21*d* is for trapping mist of the amine compound along with the exhaust gas 3, and is provided on the downstream side of the gas-liquid contact portion 21*a*. The exhaust gas 3 having passed through the demister 21*d* is released to the outside as a washed exhaust gas 8.

The demister 21*d* of the present embodiment is preferably installed at a position where it does not overlap with the gas-liquid contact portion 21*a* as seen downward from above. Namely, the demister 21*d* is preferably installed at a position where its projection position on the horizontal plane does not overlap with the projection position of the gas-liquid contact portion 21*a* on the horizontal plane. By disposing the demister 21*d* as above, the washing liquid 7 falling from the gas-liquid contact portion 21*a* is able not to directly strike the demister 21*d*.

The demister 21*d* may constitute a portion of the washing apparatus 21 or may be separated from the washing apparatus 21. In the latter case, the demister 21*d* may be provided on a nozzle stub that protrudes from the main body of the washing apparatus 21 for discharging the washed exhaust gas 8, for example, as shown in FIG. 1, or may be provided on a pipe and the like that is connected to the main body of the washing apparatus 21 and transfers the washed exhaust gas 8.

The controller 25 controls various kinds of operation of the carbon dioxide capturing system. An example of the controller 25 is a processor or a computer. The controller 25 controls, for example, rotational speeds of the absorbing liquid pump 12, the condensed water pump 20 and the washing liquid pump 23, cooling operation of the absorbing liquid cooler 16 and the washing liquid cooler 24, heating operation of the reboiler 15, and the like.

Examples of the amine compound contained in the absorbing liquid 2 can include, for example, "alcoholic hydroxyl group-containing primary amines" such as monoethanolamine and 2-amino-2-methyl-1-propanol, "alcoholic hydroxyl group-containing secondary amines" such as diethanolamine and 2-methylaminoethanol, and "alcoholic hydroxyl group-containing tertiary amines" such as triethanolamine and N-methyldiethanolamine. They can further include "polyethylenepolyamines" such as ethylenediamine, triethylenediamine and diethylenetriamine, "cyclic amines" such as piperazines, piperidines and pyrrolidines, "polyamines" such as xylylenediamine, and "amino acids" such as methylaminocarboxylic acid. They can further include a mixture containing at least any of the amine compounds above.

Moreover, examples of the absorbing liquid 2 can include an aqueous solution containing 10 to 70 wt % of one or more of such amine compounds. Moreover, the absorbing liquid 2 may contain a carbon dioxide absorption promoter, a corrosion inhibitor, and/or another medium (for example, methanol, polyethylene glycol, sulfolane or the like).

(1) Gas-Liquid Contact Portion 11a in Absorber 11

In the absorber 11, the combustion exhaust gas 1 rises in the gas-liquid contact portion 11a, and the absorbing liquid 2 descends in the gas-liquid contact portion 11a. As above, the absorber 11 brings the combustion exhaust gas 1 and the absorbing liquid 2 into contact with each other through a counterflow of these in the gas-liquid contact portion 11a.

Since the combustion exhaust gas 1 rises from the lower portion to the upper portion of the gas-liquid contact portion 11a, a $CO_2$ concentration in the combustion exhaust gas 1 is low in the upper portion of the gas-liquid contact portion 11a. Therefore, it is desirable that in the upper portion, the combustion exhaust gas 1 is brought into contact with the absorbing liquid 2 that is high in $CO_2$ absorbing performance (high in driving force). Namely, it is desirable that in the upper portion, $CO_2$ is removed from the combustion exhaust gas 1 with the absorbing liquid 2 that is low in $CO_2$ concentration.

Meanwhile, the $CO_2$ concentration in the combustion exhaust gas 1 is high in the lower portion of the gas-liquid contact portion 11a. Therefore, in the lower portion, even the absorbing liquid 2 that is low in $CO_2$ absorbing performance (low in driving force) can sufficiently absorb $CO_2$. Namely, in the lower portion, $CO_2$ can be sufficiently removed from the combustion exhaust gas 1 even with the absorbing liquid 2 that is high in $CO_2$ concentration.

Accordingly, it is rational that the absorber 11 brings the combustion exhaust gas 1 and the absorbing liquid 2 into contact with each other through the counterflow of these. The reason is that the $CO_2$ concentration in the absorbing liquid 2 is lower in the upper portion of the gas-liquid contact portion 11a, and the $CO_2$ concentration in the absorbing liquid 2 is higher in the lower portion of the gas-liquid contact portion 11a. Namely, the absorbing liquid 2 in the upper portion is higher in $CO_2$ absorbing performance, and the absorbing liquid 2 in the lower portion is lower in $CO_2$ absorbing performance.

(2) Gas-Liquid Contact Portion 21a in Washing Apparatus 21

FIGS. 2A to 2D are schematic diagrams for explaining advantages of the washing apparatus 21 of the first embodiment.

Figure 2A:
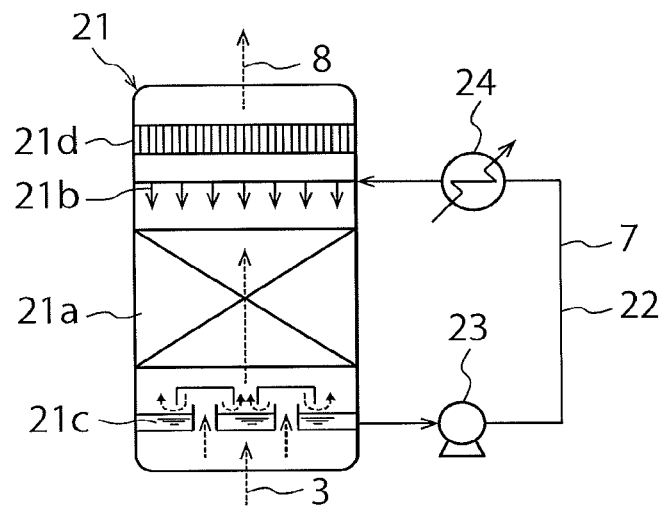
FIGS. 2A to 2D are schematic diagrams for explaining advantages of a washing apparatus of the first embodiment.
Figure 2B:
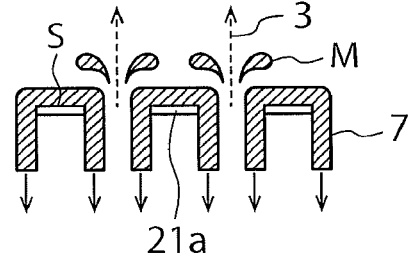

FIG. 2A shows the washing apparatus 21 of a comparative example of the first embodiment. FIG. 2B shows a situation near an upper face S of the gas-liquid contact portion 21a in this washing apparatus 21. Differently from the washing apparatus 21 in FIG. 1, this washing apparatus 21 brings the $CO_2$-removed exhaust gas 3 and the washing liquid 7 in contact with each other through a counterflow of these (FIG. 2A).

The amine compound along with the exhaust gas 3 is roughly categorized into vapor-like amine and mist-like amine. As a result of investigation, it was found that when the exhaust gas 3 and the washing liquid 7 were brought into contact with each other through the counterflow of these, mist M of the amine compound tended to arise near the upper face S of the gas-liquid contact portion 21a (FIG. 2B). Due to this, in this comparative example, it is difficult to reduce the amine compound in the exhaust gas 3 down to be in an extremely low concentration.

Figure 2C:
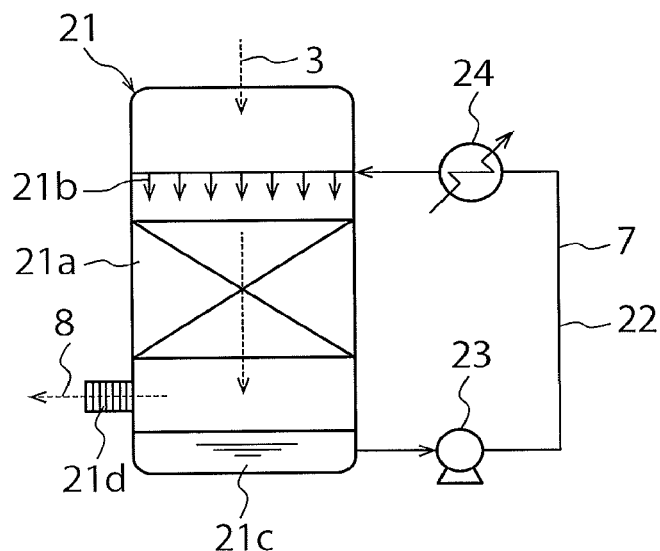
Figure 2D:
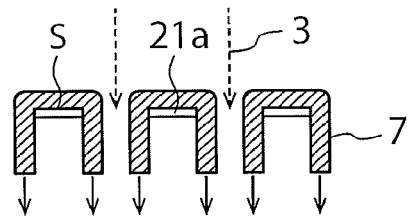

Similarly to FIG. 1, FIG. 2C shows the washing apparatus 21 of the first embodiment. FIG. 2D shows a situation near an upper face S of the gas-liquid contact portion 21a of this washing apparatus 21. This washing apparatus 21 brings the $CO_2$-removed exhaust gas 3 and the washing liquid 7 into contact with each other through a parallel flow of these (FIG. 2C).

From the result of the investigation, an idea was obtained to suppress generation of the mist M by bringing the exhaust gas 3 and the washing liquid 7 into contact with each other through a parallel flow of these (FIG. 2D). Moreover, it was confirmed that in the washing apparatus 21, the amine concentration in the exhaust gas 3 was low and a difference in amine concentration in the washing liquid 7 between the upper portion and the lower portion of the washing apparatus 21 was small, and hence, that gas washing performance (driving force) of the washing liquid 7 did not largely vary across the washing apparatus 21. Accordingly, according to the present embodiment, it was found that the exhaust gas 3 could be effectively washed with the washing liquid 7 while suppressing generation of mist M.

It is desirable to make up new washing liquid 7 into the washing apparatus 21 as needed in order to maintain the amine concentration in the washing liquid 7 to be less than a management value. In this case, it is desirable to take out a washing liquid 7 in substantially the same amount as the amount of making up the washing liquid 7 from the washing apparatus 21.

Moreover, the washing apparatus 21 of the present embodiment includes the demister 21d near the outlet of the exhaust gas 3. Thereby, the amine compound released along with the exhaust gas 3 can be further reduced. The demister 21d of the present embodiment is provided at a position where it does not overlap with the gas-liquid contact portion 21a in the vertical direction such that it does not directly suffer the washing liquid 7 falling from the gas-liquid contact portion 21a.

As above, in the present embodiment, the exhaust gas 3 that is released from the absorber 11 and accompanied by the amine compound is introduced into the washing apparatus 21. Then, the washing apparatus 21 of the present embodiment brings the exhaust gas 3 and the washing liquid 7 into contact with each other through a parallel flow of these from the upper portion to the lower portion of the gas-liquid contact portion 21a, and thereby, washes the exhaust gas 3 with the washing liquid 7. Therefore, according to the present embodiment, the exhaust gas 3 is effectively washed with the washing liquid 7 while suppressing generation of mist of the amine compound, so that a release amount of the amine compound released to the air can be reduced.

Second Embodiment

Figure 3:
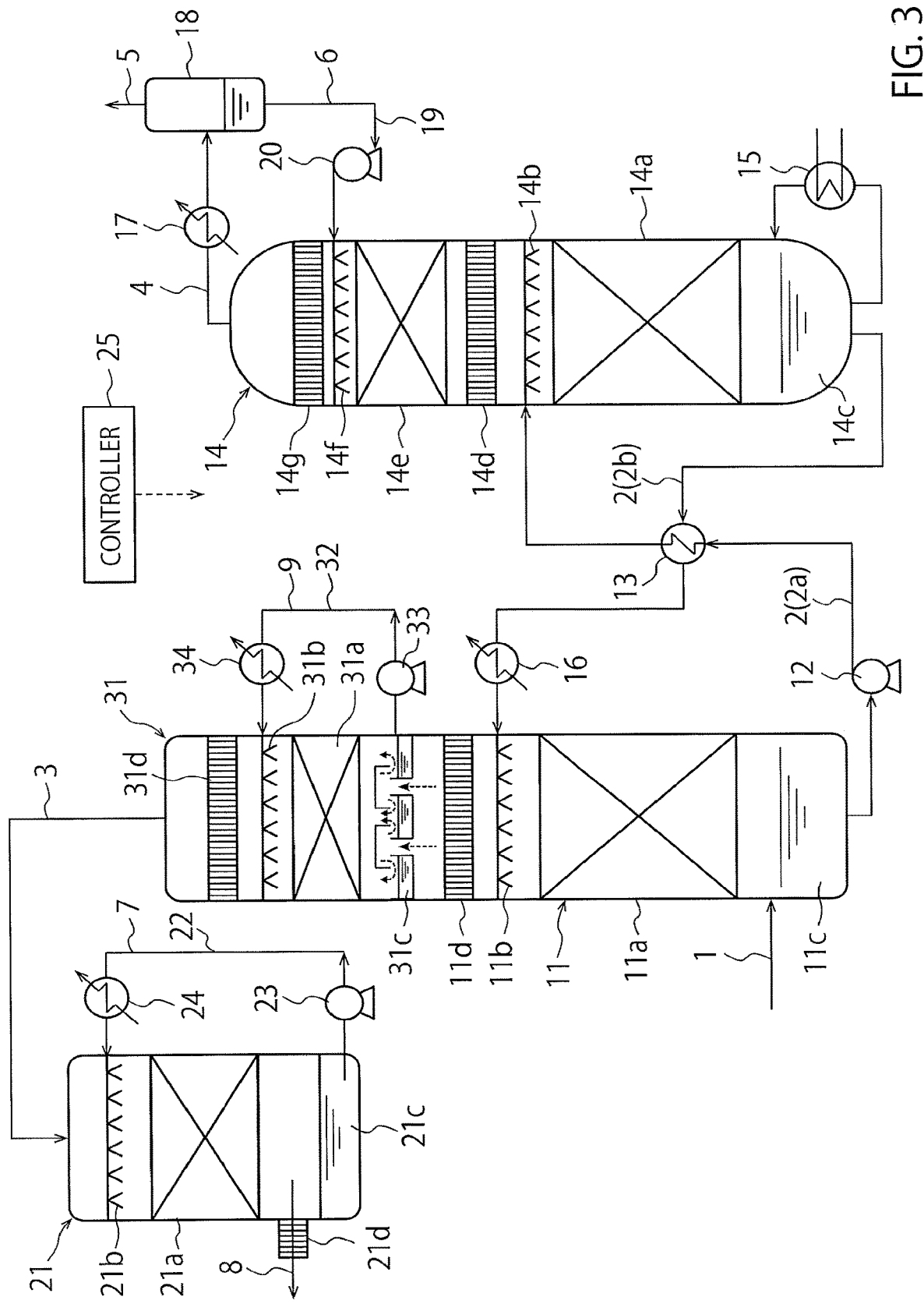
FIG. 3 is a schematic diagram showing a configuration of a carbon dioxide capturing system of a second embodiment.

FIG. 3 is a schematic diagram showing a configuration of a carbon dioxide capturing system of a second embodiment.

The carbon dioxide capturing system in FIG. 3 includes, as well as the constituents in FIG. 1, a pre-washing apparatus 31, a pre-washing liquid channel 32, a pre-washing liquid pump and a pre-washing liquid cooler 34. Moreover, the pre-washing apparatus 31 includes a gas-liquid contact portion 31a, a distributor 31b, a liquid reservoir 31c and a demister 31d.

The pre-washing apparatus 31 is provided above the demister 11d in the absorber 11, and the combustion exhaust gas 1 having passed through the demister 11d flows in the pre-washing apparatus 31. The pre-washing apparatus 31 has an inlet of the combustion exhaust gas 1 below the gas-liquid contact portion 31a, and has an inlet of a pre-washing liquid 9 above the gas-liquid contact portion 31a. An example of the pre-washing liquid 9 is water (for example, pure water).

The pre-washing apparatus 31 brings the combustion exhaust gas 1 into contact with the pre-washing liquid 9 in the gas-liquid contact portion 31a, and thereby, washes (pre-washes) the combustion exhaust gas 1 with the pre-washing liquid 9. Specifically, the pre-washing liquid 9 distributed and caused to fall from the distributor 31b comes into contact with the combustion exhaust gas 1 rising in the gas-liquid contact portion 31a, so that the combustion exhaust gas 1 is washed with the pre-washing liquid 9. As above, the pre-washing apparatus 31 brings the combustion exhaust gas 1 and the pre-washing liquid 9 into contact with each other through a counterflow of these in the gas-liquid contact portion 31a.

The pre-washing liquid 9 having passed through the gas-liquid contact portion 31a is collected in the liquid reservoir 31c, and discharged from the liquid reservoir 31c to the pre-washing liquid channel 32. This pre-washing liquid 9 is transferred by the pre-washing liquid pump 33, cooled by the pre-washing liquid cooler 34, and introduced again into the pre-washing apparatus 31 from the inlet of the pre-washing liquid 9.

Meanwhile, the combustion exhaust gas 1 having passed through the gas-liquid contact portion 31a flows in the demister 31d. The demister 31d is provided for trapping mist of the amine compound along with the combustion exhaust gas 1. The combustion exhaust gas 1 having passed through the demister 31d is released from the top portion of the absorber 11 as the $CO_2$-removed exhaust gas 3, and flows in the washing apparatus 21.

As above, before the combustion exhaust gas 1 of the present embodiment is released from the absorber 11 to the washing apparatus 21, it is pre-washed by the pre-washing apparatus 31. Thereby, the amine compound along with the combustion exhaust gas 1 can be removed to some extent before introduced into the washing apparatus 21, so that an increase rate of the amine concentration of the washing liquid 7 in the washing apparatus 21 can be suppressed.

The pre-washing liquid 9 in the pre-washing apparatus 31 has a relatively high amine concentration. Therefore, by returning the pre-washing liquid 9, for example, to the lean liquid 2b, the amine compound in the pre-washing liquid 9 may be reused. The pre-washing liquid 9 may be directly returned from the pre-washing apparatus 31 to the lean liquid 2b, or may be returned from the pre-washing apparatus 31 to the lean liquid 2b via a preprocessing module. The preprocessing module performs processing for increasing the amine concentration in the pre-washing liquid 9.

The pre-washing apparatus 31 may be installed in the absorber 11, or may be installed outside the absorber 11. The pre-washing apparatus 31 of the present embodiment brings the combustion exhaust gas 1 and the pre-washing liquid 9 into contact with each other through a counterflow of these, and hence, is suitable for being installed in the absorber 11. On the other hand, an example of the pre-washing apparatus 31 installed outside the absorber 11 is described for a third embodiment.

Third Embodiment

Figure 4:
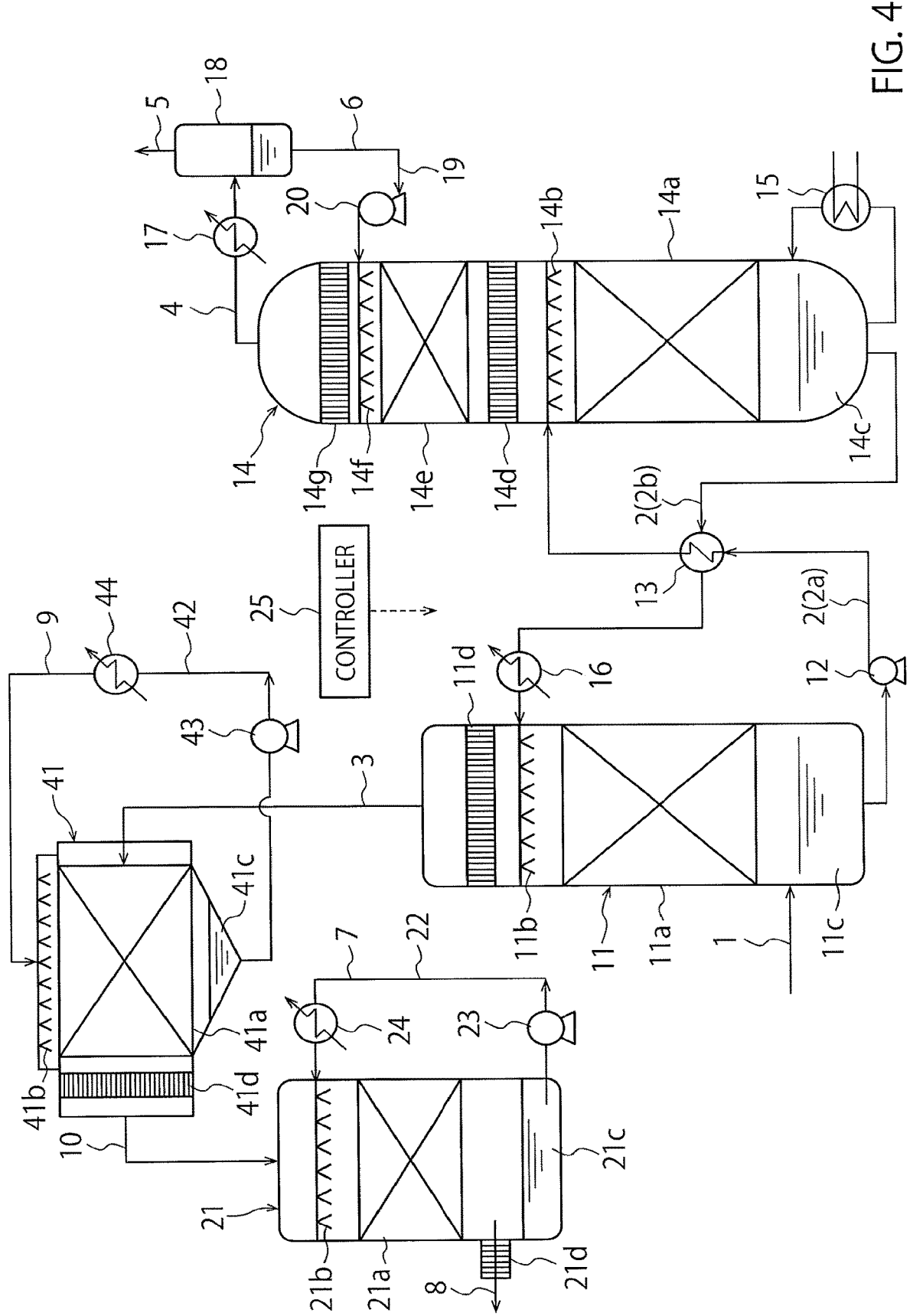
FIG. 4 is a schematic diagram showing a configuration of a carbon dioxide capturing system of the third embodiment.

FIG. 4 is a schematic diagram showing a configuration of a carbon dioxide capturing system of the third embodiment.

The carbon dioxide capturing system in FIG. 4 includes, as well as the constituents in FIG. 1, a pre-washing apparatus 41, a pre-washing liquid channel 42, a pre-washing liquid pump 43 and a pre-washing liquid cooler 44. Moreover, the pre-washing apparatus 41 includes a gas-liquid contact portion 41a, a distributor 41b, a liquid reservoir 41c and a demister 41d.

The $CO_2$-removed exhaust gas 3 released from the absorber 11 flows in the pre-washing apparatus 41. The pre-washing apparatus 41 has an inlet of the exhaust gas 3 on a lateral side of the gas-liquid contact portion 41a, and has an inlet of the pre-washing liquid 9 above the gas-liquid contact portion 41a. An example of the pre-washing liquid 9 is water (for example, pure water).

The pre-washing apparatus 41 brings the exhaust gas 3 into contact with the pre-washing liquid 9 in the gas-liquid contact portion 41a, and thereby, washes (pre-washes) the exhaust gas 3 with the pre-washing liquid 9. Specifically, the pre-washing liquid 9 distributed and caused to fall from the distributor 41b comes into contact with the exhaust gas 3 moving in the gas-liquid contact portion 41a in the horizontal direction, so that the exhaust gas 3 is washed with the pre-washing liquid 9. As above, the pre-washing apparatus 41 brings the exhaust gas 3 and the pre-washing liquid 9 into contact with each other through a crossflow of these in the gas-liquid contact portion 41a.

The pre-washing liquid 9 having passed through the gas-liquid contact portion 41a is collected in the liquid reservoir 41c, and discharged from the liquid reservoir 41c to the pre-washing liquid channel 42. This pre-washing liquid 9 is transferred by the pre-washing liquid pump 43, cooled by the pre-washing liquid cooler 44, and introduced again into the pre-washing apparatus 41 from the inlet of the pre-washing liquid 9.

Meanwhile, the exhaust gas 3 having passed through the gas-liquid contact portion 41a flows in the demister 41d. The demister 41d is provided for trapping mist of the amine compound along with the exhaust gas 3. The exhaust gas 3 having passed through the demister 41d is released from the pre-washing apparatus 41 as a pre-washed exhaust gas 10, and flows in the washing apparatus 21.

As above, before the $CO_2$-removed exhaust gas 3 of the present embodiment is introduced from the absorber 11 to the washing apparatus 21, it is pre-washed by the pre-washing apparatus 41. Thereby, the amine compound along with the exhaust gas 3 can be removed to some extent before introduced into the washing apparatus 21, so that an increase rate of the amine concentration of the washing liquid 7 in the washing apparatus 21 can be suppressed.

Since similarly to the washing apparatus 21, the pre-washing apparatus 41 employs a contact scheme different from a counterflow, the exhaust gas 3 can be effectively washed while suppressing generation of mist of the amine compound. Therefore, the pre-washing apparatus 41 may be disposed in a post-stage of the washing apparatus 21 in place of being disposed in a pre-stage of the washing apparatus 21. In this case, the washing apparatus 21 and the pre-washing apparatus 41 may be respectively called a "pre-washing apparatus" and a "washing apparatus", instead, or may be respectively called a "washing apparatus" and a "post-washing apparatus", instead.

Fourth Embodiment

Figure 5:
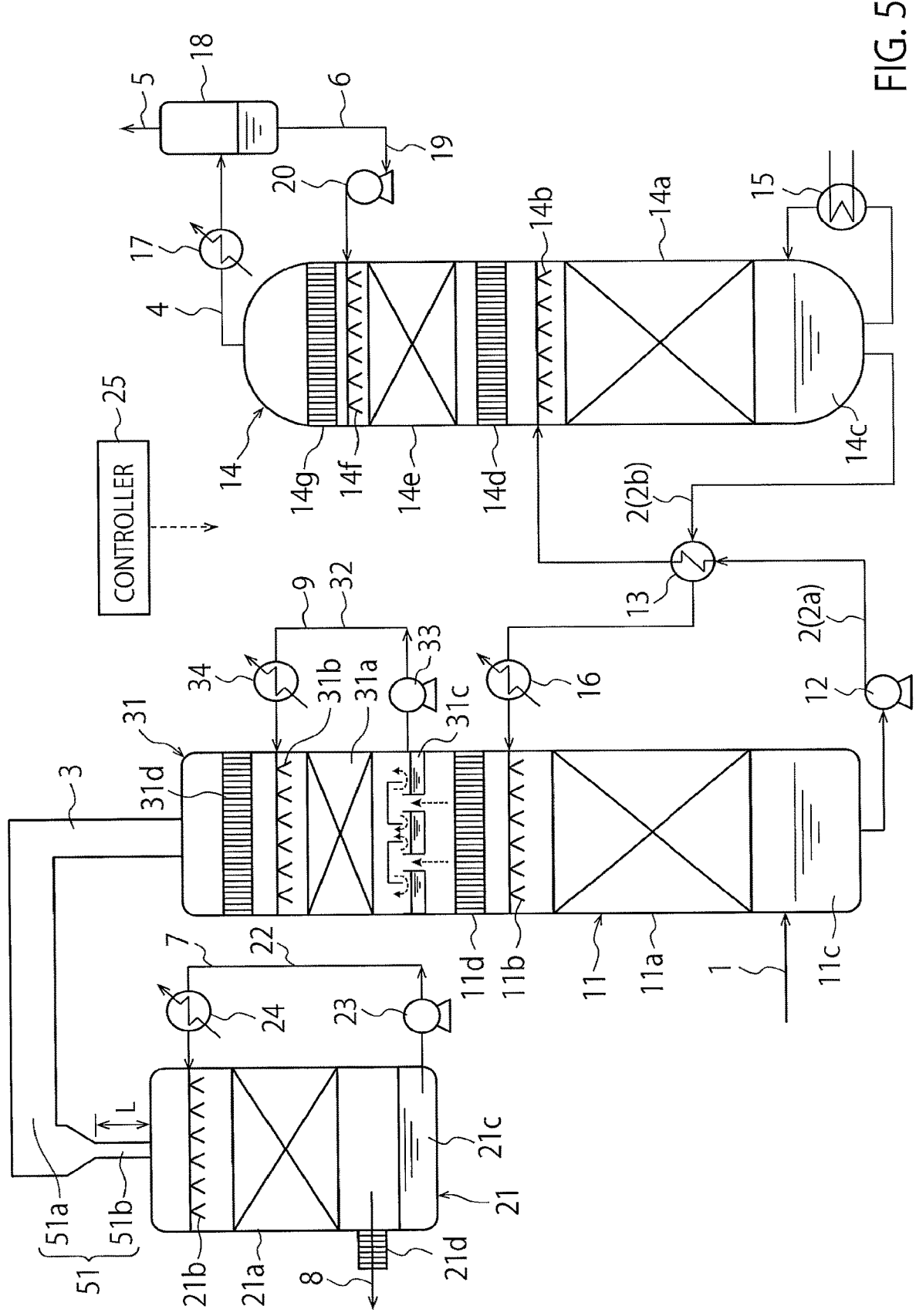
FIG. 5 is a schematic diagram showing a configuration of a carbon dioxide capturing system of a fourth embodiment.

FIG. 5 is a schematic diagram showing a configuration of a carbon dioxide capturing system of a fourth embodiment.

The carbon dioxide capturing system in FIG. 5 includes, as well as the constituents in FIG. 3, an exhaust gas pipe 51 including first and second pipe portions 51a and 51b.

The exhaust gas pipe 51 is a pipe for transferring the $CO_2$-removed exhaust gas 3 from the absorber 11 to the washing apparatus 21. The first pipe portion 51a has a first pipe diameter as the diameter (internal diameter) of the pipe 51. The second pipe portion 51b has a second pipe diameter smaller than the first pipe diameter as the diameter (internal diameter) of the pipe 51. Namely, the second pipe portion 51b is configured to be thinner than the first pipe portion 51a.

In the present embodiment, since the second pipe portion 51b is thinner than the first pipe portion 51a, the flow velocity of the exhaust gas 3 increases when the exhaust gas 3 flows in the second pipe portion 51b from the first pipe portion 51a. Furthermore, when the flow section area of the washing apparatus 21 is thinner than the flow section area of the absorber 11, the flow velocity of the exhaust gas 3 in the washing apparatus 21 is further increased. The increased flow velocity of the exhaust gas 3 leads to larger inertia force acting on mist of the amine compound along with the exhaust gas 3. Therefore, the mist cannot follow the flow of the exhaust gas 3, so that the mist can be easily trapped in the gas-liquid contact portion 21a and the demister 21d.

When the gas-liquid contact portion 21a employs counterflow contact, it is concerned that the faster flow velocity of the exhaust gas 3 causes increase of mist generated on the upper face of the gas-liquid contact portion 21a (see FIG. 2B) and that flooding which is a backflow of the washing liquid 7, or the like, arises. Nevertheless, since the gas-liquid contact portion 21a of the present embodiment employs parallel flow contact, the flow velocity of the exhaust gas 3 can be increased while suppressing these problems. It is desirable that a length L of the second pipe portion 51b is set to be 5 times or more the second pipe diameter in order to sufficiently stabilize the flow velocity of the exhaust gas 3.

Figure 6:
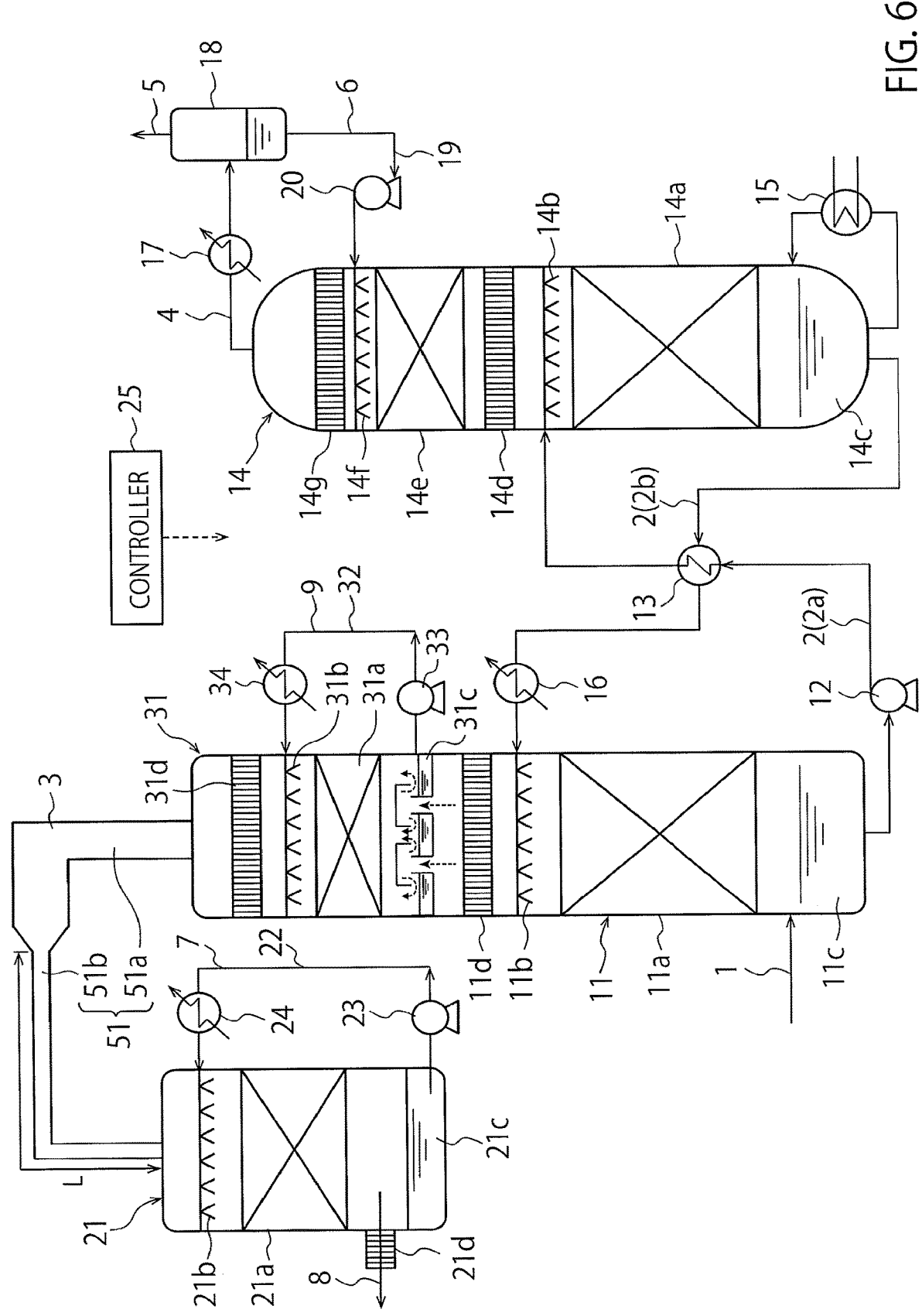
FIG. 6 is a schematic diagram showing a configuration of a carbon dioxide capturing system of a modification of the fourth embodiment.

FIG. 6 is a schematic diagram showing a configuration of a carbon dioxide capturing system of a modification of the fourth embodiment.

In general, the height of the absorber 11 is set to be high, being 40 to 50 m. Therefore, if the exhaust gas pipe 51 extends above the absorber 11, the height of the whole carbon dioxide capturing system is caused to be further higher. Hence, it is desirable that the exhaust gas pipe 51 does not include a portion extending above the absorber 11 as less as possible.

Therefore, the exhaust gas pipe 51 in FIG. 6 includes more portion extending in the horizontal direction (similarly to the exhaust gas pipe 51 in FIG. 5). As a result, the second pipe portion 51b is to include a bent portion of the exhaust gas pipe 51 as in FIG. 6 in many cases.

In the present embodiment, in place of providing the first and second pipe portions 51a and 51b in the exhaust gas pipe 51, a valve may be provided on the exhaust gas pipe 51. In this case, by adjusting the degree of opening of the valve, the flow rate of the exhaust gas can be increased.

Fifth Embodiment

Figure 7:
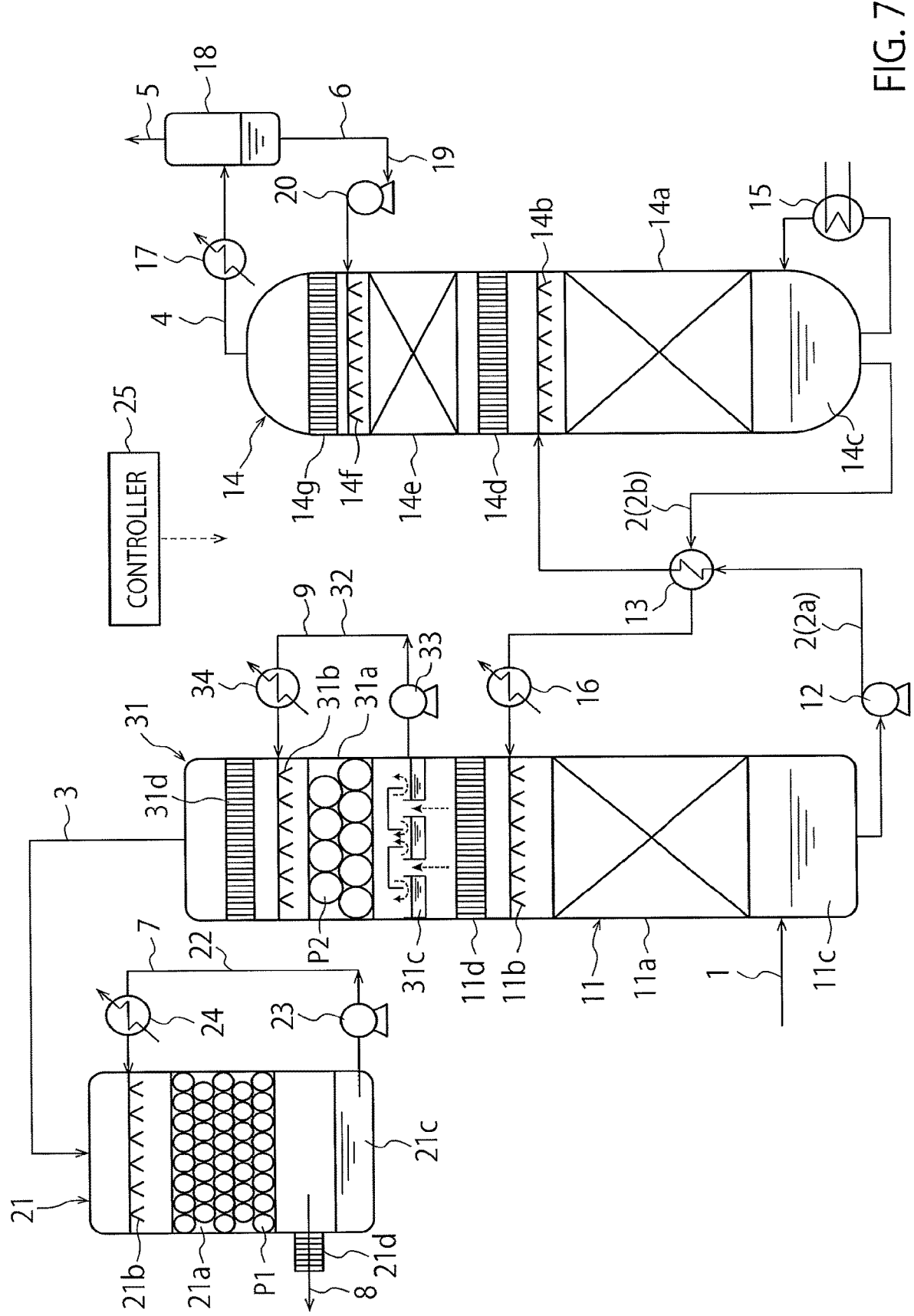
FIG. 7 is a schematic diagram showing a configuration of a carbon dioxide capturing system of a fifth embodiment.

FIG. 7 is a schematic diagram showing a configuration of a carbon dioxide capturing system of a fifth embodiment.

FIG. 7 shows a plurality of packing materials P1 constituting the gas-liquid contact portion 21a in the washing apparatus 21, and a plurality of packing materials P2 constituting the gas-liquid contact portion 31a in the pre-washing apparatus 31. In the present embodiment, the size of each packing material P1 is set to be smaller than the size of each packing material P2. As a result, the surface area of the packing materials P1 in the washing apparatus 21 per unit volume is larger than the surface area of the packing materials P2 in the pre-washing apparatus 31 per unit volume.

Therefore, the contact area of the exhaust gas 3 and the washing liquid 7 per unit volume in the washing apparatus 21 is larger than the contact area of the exhaust gas 1 and the pre-washing liquid 9 per unit volume in the pre-washing apparatus 31. As a result, washing efficiency of the amine in the washing apparatus 21 is higher than washing efficiency of the amine in the pre-washing apparatus 31.

Here, in the case where the gas-liquid contact portion 21a employs counterflow contact, flooding of the washing liquid 7 tends to arise when the surface area of the packing materials P1 per unit volume is large. Hence, it is not preferable in this case to increase the surface area of the packing materials P1 per unit volume.

Nevertheless, since the gas-liquid contact portion 21a of the present embodiment employs parallel flow contact, a possibility of flooding of the washing liquid 7 is small. Therefore, according to the present embodiment, the surface area of the packing materials P1 per unit volume can be increased while suppressing flooding of the washing liquid 7. Thereby, a release amount of the amine compound to the air can be further reduced.

The gas-liquid contact portion 21a in the washing apparatus 21 and the gas-liquid contact portion 31a in the pre-washing apparatus 31 may be configured using a plurality of trays. In this case, it is desirable that the height of one tray in the trays of the washing apparatus 21 is smaller than the height of one tray in the trays of the pre-washing apparatus 31. Thereby, washing efficiency of the amine in the washing apparatus 21 can be further enhanced compared to the washing efficiency of the amine in the pre-washing apparatus 31.

The configurations of the washing apparatus 21 and the pre-washing apparatus 31 of the present embodiment can be applied to the second, third, fourth, sixth and seventh embodiments (note that in the third embodiment, the pre-washing apparatus 31 is replaced by the pre-washing apparatus 41).

Sixth Embodiment

Figure 8:
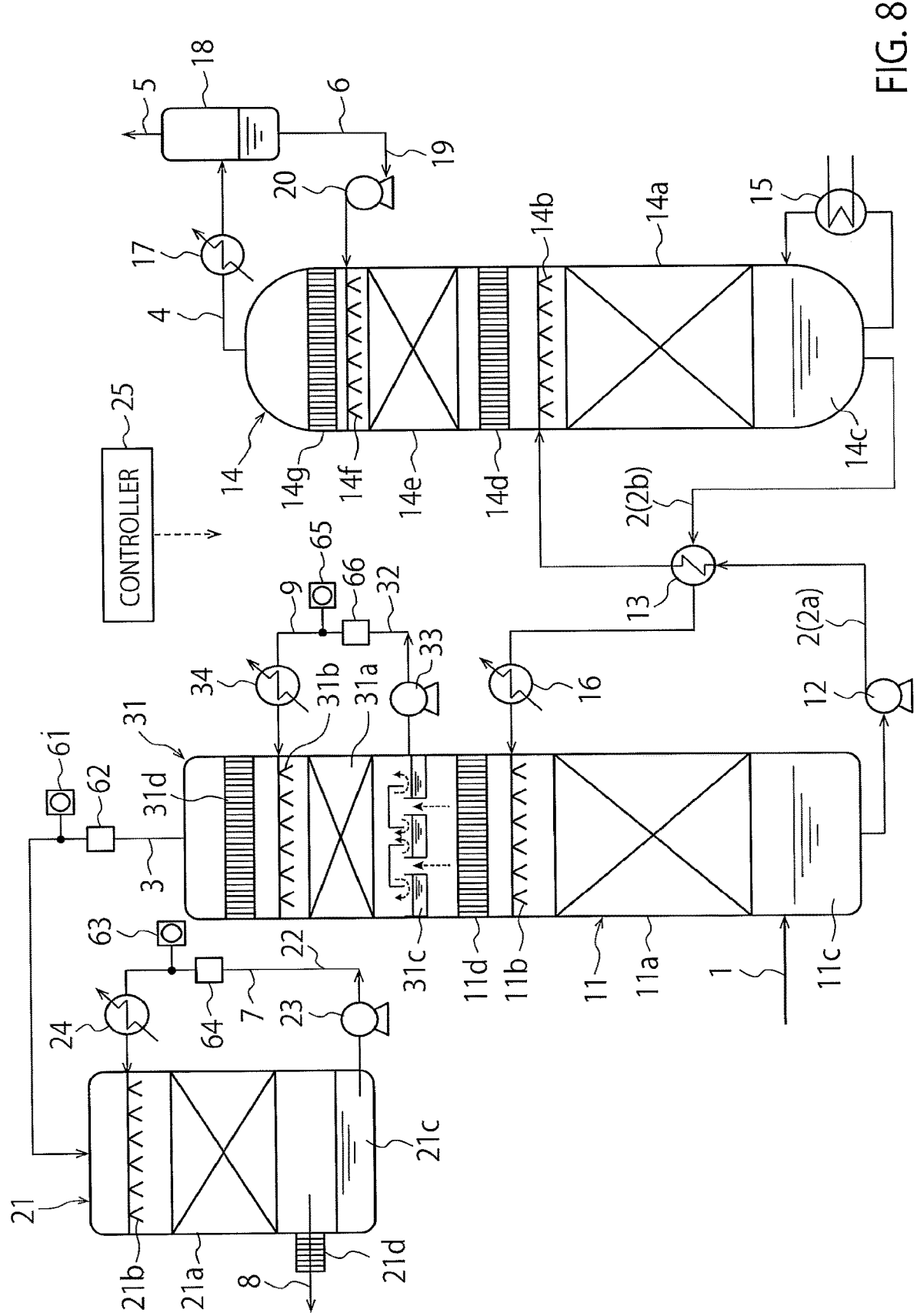
FIG. 8 is a schematic diagram showing a configuration of a carbon dioxide capturing system of the sixth embodiment.

FIG. 8 is a schematic diagram showing a configuration of a carbon dioxide capturing system of the sixth embodiment.

The carbon dioxide capturing system in FIG. 8 includes, as well as the constituents in FIG. 3, an exhaust gas measuring instrument 61, an exhaust gas adjusting module 62, a washing liquid measuring instrument 63, a washing liquid adjusting module 64, a pre-washing liquid measuring instrument 65 and a pre-washing liquid adjusting module 66.

The exhaust gas measuring instrument 61 is provided for measuring a physical quantity of the exhaust gas 3 flowing from the absorber 11 to the washing apparatus 21. The exhaust gas adjusting module 62 is provided for adjusting the physical quantity of the exhaust gas 3 flowing from the absorber 11 to the washing apparatus 21. An example of such a physical quantity is a flow rate or the like of the exhaust gas 3.

The washing liquid measuring instrument 63 is provided for measuring a physical quantity of the washing liquid 7 flowing in the washing liquid channel 22. The washing liquid adjusting module 64 is provided for adjusting the physical quantity of the washing liquid 7 flowing in the washing liquid channel 22. An example of such a washing liquid 7 is a flow rate, temperature, pH or the like of the washing liquid 7.

The pre-washing liquid measuring instrument 65 is provided for measuring a physical quantity of the pre-washing liquid 9 flowing in the pre-washing liquid channel 32. The pre-washing liquid adjusting module 66 is provided for adjusting the physical quantity of the pre-washing liquid 9 flowing in the pre-washing liquid channel 32. An example of such a physical quantity is a flow rate, temperature, pH or the like of the pre-washing liquid 9.

The controller 25 can control the exhaust gas adjusting module 62, the washing liquid adjusting module 64, the pre-washing liquid adjusting module 66 and other apparatuses based on the physical quantities measured by the exhaust gas measuring instrument 61, the washing liquid measuring instrument 63 and the pre-washing liquid measuring instrument 65. Due to this, the controller 25 can control the physical quantities of the exhaust gas 3, the washing liquid 7 and the pre-washing liquid 9. Specific examples of such control are described below.

(1) First Specific Example

The washing liquid measuring instrument 63 and the pre-washing liquid measuring instrument 65 of the present specific example measure the flow rates of the washing liquid 7 and the pre-washing liquid 9, respectively. Further, the controller 25 controls rotational speeds of the washing liquid pump 23 and the pre-washing liquid pump 33 such that the flow rate of the washing liquid 7 (first flow rate) is higher than the flow rate of the pre-washing liquid 9 (second flow rate).

As mentioned above, since the gas-liquid contact portion 21a of the washing apparatus 21 of the present embodiment employs parallel flow contact, a possibility of flooding of the washing liquid 7 is low. Therefore, the flow rate of the washing liquid 7 circulated in the washing apparatus 21 can be increased to enhance washing efficiency of the washing apparatus 21. Thereby, the flow rate of the washing liquid 7 per unit sectional area in the washing apparatus 21 becomes high, so that the effect of the washing liquid 7 to trap vapor and mist in the exhaust gas 3 becomes excellent.

Moreover, as a result of an experiment, it was found that when the flow rate of the pre-washing liquid 9 dropping into the gas-liquid contact portion 31a of the pre-washing apparatus 31 was made an exceedingly small amount with which the surface of the gas-liquid contact portion 31a was just wetted, mist in the exhaust gas 3 released from the pre-washing apparatus 31 became little. The reason can be that while suppressing generation of mist on the upper face of the gas-liquid contact portion 31a, mist in the combustion exhaust gas 1 flowing in the gas-liquid contact portion 31a is efficiently trapped in the gas-liquid contact portion 31a.

Here, an L/G ratio of the present specific example is described. The L/G ratio is a value obtained by dividing a mass flow rate of the pre-washing liquid 9 by a mass flow rate of the exhaust gas 3, and can be calculated by measuring the mass flow rates by the pre-washing liquid measuring instrument 65 and the exhaust gas measuring instrument 61. It is desirable that the controller 25 of the present specific example controls the L/G ratio to be 1 or less, more specifically, 0.5 or less. An example of such an L/G ratio is 0.01 to 0.1. Due to this, as in the aforementioned experiment, mist in the exhaust gas 3 released from the pre-washing apparatus 31 can be reduced.

(2) Second Specific Example

The washing liquid measuring instrument 63 and the pre-washing liquid measuring instrument 65 of the present specific example measure temperatures of the washing liquid 7 and the pre-washing liquid 9, respectively. Further, the controller 25 controls cooling operation of the washing liquid cooler 24 and the pre-washing liquid cooler 34 such that the temperature of the washing liquid 7 (first temperature) is lower than the temperature of the pre-washing liquid 9 (second temperature).

As advantages of decreasing the temperature of the washing liquid 7, two advantages are conceivable, for example. The first advantage is that since a vapor pressure of the amine in the washing liquid 7 is low, trapping performance of the washing liquid 7 with respect to vapor amine in the exhaust gas 3 is enhanced. The second advantage is that trapping performance of the washing liquid 7 with respect to mist amine in the exhaust gas 3 is enhanced.

Small-sized mist in the exhaust gas 3 flowing in the washing apparatus 21 tends to elude the gas-liquid contact portion 21a and the demister 21d, and the amine in this mist is possibly released to the air. Nevertheless, when the small-sized mist is cooled with the washing liquid 7 being cold, the mist grows into large-sized mist with the small-sized mist being as a core. The large-sized mist having grown can be easily trapped by the gas-liquid contact portion 21a and the demister 21d. Therefore, according to the present embodiment, the amount of the amine released to the air can be reduced by decreasing the temperature of the washing liquid 7.

(3) Third Specific Example

The washing liquid measuring instrument 63 of the present specific example is a pH measuring instrument that measures pH of the washing liquid 7. Further, the controller 25 controls operation of the washing liquid adjusting module 64 such that pH of the washing liquid 7 is a predetermined value. Specifically, the controller 25 adds acid to the washing liquid 7 from the washing liquid adjusting module 64 such that pH of the washing liquid 7 is 8 or less (more preferably, 7 or less). Due to this, gas washing performance of the washing liquid 7 can be enhanced. Examples of the acid can include sulfuric acid, nitric acid, phosphoric acid, acetic acid, boric acid and the like. The washing liquid adjusting module 64 of the present specific example is an example of a pH adjusting module.

In the carbon dioxide capturing system of the present embodiment, a plurality of washing apparatuses 21 may be provided in series in a post-stage of the absorber 11. In this case, an amine concentration in the exhaust gas 3 flowing in the washing apparatus 21 in a more post-stage is lower than an amine concentration in the exhaust gas 3 flowing in the washing apparatus 21 in a more pre-stage. Hence, the post-stage washing apparatus 21 has lower washing efficiency than the pre-stage washing apparatus 21. For example, washing efficiency of the washing apparatus 21 in the last stage is generally lowest. Accordingly, it is desirable that washing efficiency of the post-stage washing apparatus 21 is enhanced by adding the acid to the washing liquid 7 in the post-stage washing apparatus 21. For example, it is desirable that the acid is added to the washing liquid 7 in the last-stage washing apparatus 21.

Here, when the gas-liquid contact portion 21a in the washing apparatus 21 employs counterflow contact, similarly to the amine, it is concerned that the acid is released as mist to the air. Nevertheless, since the gas-liquid contact portion 21a in the washing apparatus 21 of the present embodiment employs parallel flow contact, a possibility of the acid released as mist to the air is low. Accordingly, according to the present embodiment, acid can be suppressed from being released to the air while enhancing amine washing performance of the washing liquid 7 with the acid.

An initial value of pH of the washing liquid 7 in the present specific example is approximately 2 to 5. After this washing liquid 7 is being used without supplying the acid after the start of its use, pH of the washing liquid 7 can increase to be approximately 10 to 11 due to the influence of the amine compound. In this case, gas washing performance of the washing liquid 7 becomes exceedingly low. Nevertheless, according to the present specific example, deterioration of gas washing performance of the washing liquid 7 can be suppressed by adjusting pH of the washing liquid 7 to be 8 or less (preferably, 7 or less).

As the washing liquid measuring instrument 63, the pH measuring instrument which measures pH of the washing liquid 7 may be replaced by a measuring instrument that measures a physical quantity with which pH of the washing liquid 7 can be calculated or evaluated. Examples of such a measuring instrument can include an ultrasonic measuring instrument, an infrared absorption measuring instrument, a density measuring instrument and the like. In this case, the controller 25 may convert the measured physical quantity into pH, and based on this pH, control the washing liquid adjusting module 64, or may control the washing liquid adjusting module 64 based on another physical quantity.

Moreover, the controller 25 may control the flow rates, temperatures, or pH of the washing liquid 7 and the pre-washing liquid 9 in a different method from those in the first to third specific examples. For example, the controller 25 may control the flow rates of the washing liquid 7 and the pre-washing liquid 9 by controlling the washing liquid adjusting module 64 and the pre-washing liquid adjusting module 66 in place of the washing liquid pump 23 and the pre-washing liquid pump 33. Likewise, the washing apparatus 25 may control the temperatures of the washing liquid 7 and the pre-washing liquid 9 by controlling the washing liquid adjusting module 64 and the pre-washing liquid adjusting module 66 in place of the washing liquid cooler 24 and the pre-washing liquid cooler 34.

Seventh Embodiment

Figure 9:
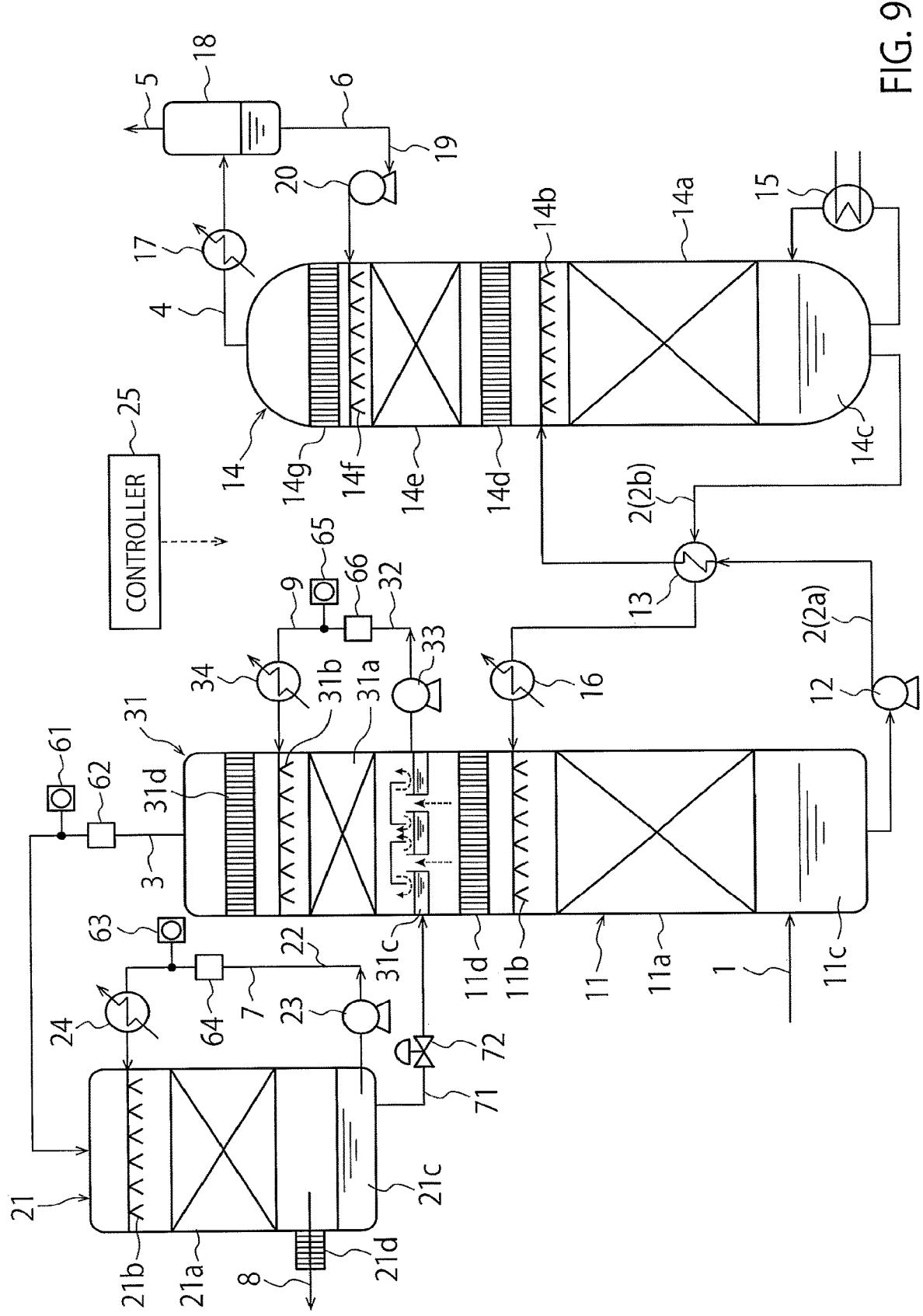
FIG. 9 is a schematic diagram showing a configuration of a carbon dioxide capturing system of the seventh embodiment.

FIG. 9 is a schematic diagram showing a configuration of a carbon dioxide capturing system of the seventh embodiment.

The carbon dioxide capturing system in FIG. 9 includes, as well as the constituents in FIG. 8, a washing liquid reuse channel 71 and a washing liquid reuse valve 72.

The washing liquid reuse channel 71 connects the liquid reservoir 21c of the washing apparatus 21 to the liquid reservoir 31c of the pre-washing apparatus 31. The washing liquid reuse valve 72 is provided on the washing liquid reuse channel 71. The washing liquid reuse channel 71 can feed the washing liquid 7 having used in the washing apparatus 21 to the pre-washing apparatus 31 for using (reusing) it as the pre-washing liquid 9. Upon open of the washing liquid reuse valve 72, at least a portion of the washing liquid 7 in the liquid reservoir 21c is introduced into the liquid reservoir 31c via the washing liquid reuse channel 71. Opening and closing the washing liquid reuse valve 72 is controlled, for example, by the controller 25.

Since the washing liquid 7 circulated in the washing apparatus 21 absorbs and stores the amine compound, its amine concentration increases over time. When the amine concentration in the washing liquid 7 is high, the washing effect of the washing liquid 7 is low. Therefore, it can be considered that after activating the carbon dioxide capturing system, to make up a new washing liquid 7 in a certain amount into the washing apparatus 21 and to take out the washing liquid 7 in the same amount as the amount of the make-up from the washing apparatus 21 the amine concentration in the washing liquid 7 may be controlled to be substantially constant.

Here, in general, an amine concentration in the washing liquid 7 circulated in the washing apparatus 21 is lower than an amine concentration in the pre-washing liquid 9 circulated in the pre-washing apparatus 31. Hence, the washing liquid 7 taken out of the washing apparatus 21 can be used as the pre-washing liquid 9 for the pre-washing apparatus 31. Accordingly, in the carbon dioxide capturing system of the present embodiment, the washing liquid 7 taken out of the washing apparatus 21 is introduced into the pre-washing apparatus 31 via the washing liquid reuse channel 71. Thereby, the taken-out washing liquid 7 can be effectively used.

Moreover, the pre-washing liquid 9 in the pre-washing apparatus 31 has a relatively high amine concentration. Hence, the amine compound in the pre-washing liquid 9 may be reused by returning the pre-washing liquid 9, for example, to the lean liquid 2b. In this case, the pre-washing liquid 9 may be directly returned from the pre-washing apparatus 31 to the lean liquid 2b, or may be returned from the pre-washing apparatus 31 to the lean liquid 2b via a preprocessing module. The preprocessing module performs processing for increasing the amine concentration in the pre-washing liquid 9. When returning the pre-washing liquid 9 to the lean liquid 2b, the carbon dioxide capturing system may include a reuse channel for transferring the pre-washing liquid 9 from the liquid reservoir 31c of the pre-washing apparatus 31 to a channel for the lean liquid 2b, and a reuse valve provided on this reuse channel.

While certain embodiments have been described, these embodiments have been presented by way of example only, and are not intended to limit the scope of the inventions.

Indeed, the novel systems and methods described herein may be embodied in a variety of other forms; furthermore, various omissions, substitutions and changes in the form of the systems and methods described herein may be made without departing from the spirit of the inventions. The accompanying claims and their equivalents are intended to cover such forms or modifications as would fall within the scope and spirit of the inventions.

The invention claimed is:

1. A carbon dioxide capturing system comprising:
   an absorber comprising a first contact portion that brings a combustion exhaust gas comprising carbon dioxide into contact with an absorbing liquid comprising an amine compound, causing the absorbing liquid to absorb at least a portion of the carbon dioxide in the combustion exhaust gas at the first contact portion, and releasing the combustion exhaust gas; and
   a washing apparatus comprising a second contact portion that brings the combustion exhaust gas released from the first contact portion of the absorber into contact with a washing liquid and a distributor that distributes the washing liquid downward to the second contact portion,
   wherein the distributor is provided at an upstream side of the second contact portion along a flow of the combustion exhaust gas.

2. The system of claim 1, further comprising a demister on a downstream side of the second contact portion.

3. The system of claim 2, wherein the demister is provided at a position where a projection position of the demister on a horizontal plane does not overlap with a projection position of the second contact portion on the horizontal plane.

4. The system of claim 1, further comprising:
   a pH adjusting module configured to adjust pH of the washing liquid used in the washing apparatus; and
   a controller configured to control the pH to be a predetermined value by controlling the pH adjusting module.

5. The system of claim 1, wherein a pipe that transfers the combustion exhaust gas from the absorber to the washing apparatus comprises a first pipe portion having a first pipe diameter and a second pipe portion provided on a downstream side of the first pipe portion and having a second pipe diameter smaller than the first pipe diameter.

6. The system of claim 5, wherein the second pipe portion comprises a bent portion of the pipe.

* * * * *